(12) United States Patent
Kumakawa et al.

(10) Patent No.: US 11,715,606 B2
(45) Date of Patent: Aug. 1, 2023

(54) SOLID ELECTROLYTIC CAPACITOR HAVING A METAL FILM FORMED ON A PORTION OF A CATHODE BODY EXPOSED FROM AN EXTERIOR BODY

(71) Applicant: Panasonic Intellectual Property Management Co., Ltd., Osaka (JP)

(72) Inventors: Takahiro Kumakawa, Kyoto (JP); Renki Yamazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/325,273

(22) Filed: May 20, 2021

(65) Prior Publication Data
US 2021/0383981 A1    Dec. 9, 2021

(30) Foreign Application Priority Data
Jun. 5, 2020    (JP) ................................ 2020-098579

(51) Int. Cl.
*H01G 9/042* (2006.01)
*H01G 9/012* (2006.01)
*H01G 9/15* (2006.01)
*H01G 9/10* (2006.01)

(52) U.S. Cl.
CPC ............ *H01G 9/15* (2013.01); *H01G 9/012* (2013.01); *H01G 9/0425* (2013.01); *H01G 9/10* (2013.01)

(58) Field of Classification Search
CPC .......... H01G 9/15; H01G 9/0425; H01G 9/10; H01G 9/012
See application file for complete search history.

(56) References Cited

U.S. PATENT DOCUMENTS

| | | | | |
|---|---|---|---|---|
| 5,142,452 | A * | 8/1992 | Saiki ...................... | H01G 9/012 29/25.03 |
| 2002/0001169 | A1* | 1/2002 | Shiraishi .................. | H01G 9/26 361/523 |
| 2004/0066608 | A1* | 4/2004 | Takagi ..................... | H01G 9/15 361/530 |
| 2004/0094321 | A1* | 5/2004 | Nakamura ........... | H01G 9/0425 174/521 |
| 2007/0285876 | A1* | 12/2007 | Takatani .................. | H01G 9/02 29/25.03 |
| 2008/0106855 | A1* | 5/2008 | Utashiro ................ | H01G 9/012 361/541 |
| 2010/0165547 | A1 | 7/2010 | Kuranuki et al. | |
| 2019/0006117 | A1* | 1/2019 | Djebara ................... | H01G 9/15 |

(Continued)

FOREIGN PATENT DOCUMENTS

| JP | 2004165423 A * | 6/2004 | ............ H01G 9/025 |
|---|---|---|---|
| JP | 2008-091465 | 4/2008 | |

(Continued)

*Primary Examiner* — David M Sinclair
(74) *Attorney, Agent, or Firm* — Wenderoth, Lind & Ponack, L.L.P.

(57) ABSTRACT

A method of manufacturing a solid electrolytic capacitor according to the exemplary embodiment of the present disclosure includes a step of exposing a cathode body end portion, which is a portion of a cathode body, from an exterior body covering the cathode body, which is a conductor, and forming a contact electrode, which is a metal film, on the exposed cathode body end portion.

7 Claims, 7 Drawing Sheets

(56) References Cited

U.S. PATENT DOCUMENTS

2020/0266005 A1* 8/2020 Suzuki ................. H01G 9/0032
2020/0273628 A1* 8/2020 Suzuki ................... H01G 9/048

FOREIGN PATENT DOCUMENTS

| JP | 2009-076872 | 4/2009 | |
|----|----|----|----|
| JP | 2010-062406 | 3/2010 | |
| WO | WO-2019065870 A1 * | 4/2019 | ........... H01G 9/0032 |
| WO | WO-2019087692 A1 * | 5/2019 | ........... H01G 9/0032 |

* cited by examiner

SOLID ELECTROLYTIC CAPACITOR HAVING A METAL FILM FORMED ON A PORTION OF A CATHODE BODY EXPOSED FROM AN EXTERIOR BODY

BACKGROUND

1. Technical Field

The present disclosure relates to a method of manufacturing a metal film, a method of manufacturing a solid electrolytic capacitor, and the solid electrolytic capacitor.

2. Description of the Related Art

In recent years, a solid electrolytic capacitor having excellent impedance characteristics in a high frequency region is used in an electronic device such as a personal computer. In order to cope with higher frequencies of the electronic device, there is a demand for lower equivalent series resistance (ESR) and lower equivalent series inductance (ESL) of the solid electrolytic capacitor. In order to meet such demands and to provide a compact solid electrolytic capacitor, an end face current collecting structure in which an anode end face and a cathode end face are directly connected to an external electrode is proposed. A solid electrolytic capacitor having the end face current collecting structure is disclosed in, for example, Japanese Patent Unexamined Publication No. 2010-62406.

SUMMARY

According to an aspect of the present disclosure, there is provided a method of manufacturing a metal film including a step of exposing a portion of a conductor from an exterior body covering the conductor and forming a metal film on the exposed conductor.

According to another aspect of the present disclosure, there is provided a method of manufacturing a solid electrolytic capacitor including a step of forming a plurality of capacitor elements each having an anode body and a cathode body; a step of laminating the plurality of capacitor elements on each other; a step of covering the plurality of capacitor elements with an exterior body; and a step of exposing the cathode body of each of the plurality of capacitor elements by spraying solid-phase metal particles from the cathode body side of the capacitor element to grind the exterior body and colliding the solid-phase metal particles with the exposed cathode body to form a metal film.

According to still another aspect of the present disclosure, there is provided a solid electrolytic capacitor including a capacitor element having an anode body, a dielectric film covering the anode body, and a cathode body formed on the dielectric film; and an exterior body formed so that the cathode body is exposed, in which a metal film is formed on a portion of the cathode body exposed from the exterior body.

DETAILED DESCRIPTIONS

In order to manufacture a solid electrolytic capacitor at low cost, it is strongly desired to reduce a manufacturing cost. In addition, it is also desired to further reduce the size of the solid electrolytic capacitor.

Therefore, an object of the present disclosure is to provide a compact solid electrolytic capacitor that can be manufactured at low cost, a method of manufacturing a metal film, and a method of manufacturing a solid electrolytic capacitor.

Hereinafter, exemplary embodiments of the present disclosure will be described with reference to the drawings. The

First Exemplary Embodiment

Figure 1A:
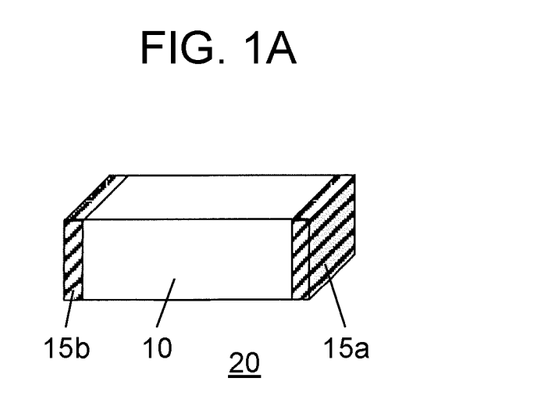
FIG. 1A is a perspective view of a solid electrolytic capacitor according to a first exemplary embodiment of the present disclosure.
Figure 1B:
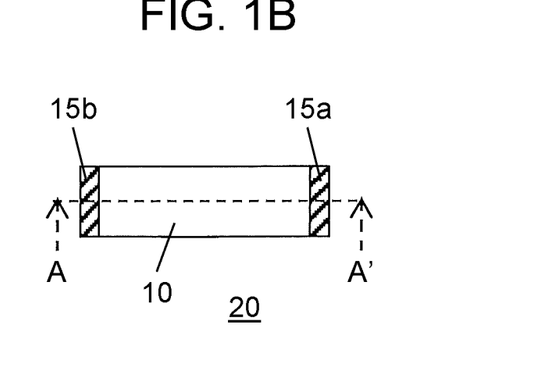
FIG. 1B is a top view of the solid electrolytic capacitor according to the first exemplary embodiment of the present disclosure.
Figure 2:
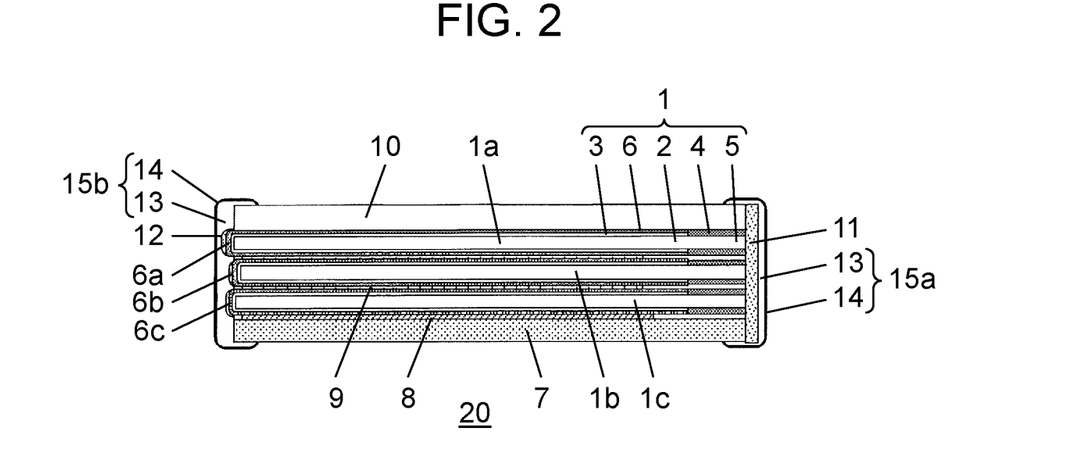
FIG. 2 is a cross-sectional view taken along line A-A' of FIG. 1B.

A configuration of a solid electrolytic capacitor according to a first exemplary embodiment of the present disclosure will be described with reference to FIGS. 1A, 1B, and 2. FIG. 1A is a perspective view of the solid electrolytic capacitor according to the first exemplary embodiment of the present disclosure, and FIG. 1B is a top view of the solid electrolytic capacitor. FIG. 2 is a cross-sectional view taken along line A-A' of FIG. 1B.

Solid electrolytic capacitor 20 of the first exemplary embodiment of the present disclosure includes capacitor element 1, support member 7, exterior body 10, base electrode 11, contact electrode 12, conductive layer 13, surface treatment layer 14, anode-side external electrode 15a, and cathode-side external electrode 15b. In the example illustrated in FIG. 2, the left side of the figure is a cathode side, and the right side of the figure is an anode side. In the first exemplary embodiment of the present disclosure, as illustrated in FIGS. 1 and 2, a plane on which anode-side external electrode 15a is disposed and a plane on which cathode-side external electrode 15b is disposed are parallel to each other.

Capacitor Element 1

Capacitor element 1 includes anode body 2, dielectric body 3, resister 4, anode electrode unit 5, and cathode body 6. Dielectric body 3 is obtained by forming a porous layer on both sides of an aluminum (Al) foil, which is a valve metal, by a method such as chemical etching, and forming a dielectric film and a solid electrolyte layer on the porous layer.

Anode body 2 is a core material portion of the Al foil that remains without being made porous. Dielectric body 3 is disposed on an upper surface and a lower surface of anode body 2.

The thickness of anode body 2 and the thickness of dielectric body 3 are 20 μm or more and 80 μm or less, respectively. The material of anode body 2 and dielectric body 3 is not limited to Al foil, and may be, for example, tantalum (Ta) generally used as a capacitor material.

Anode electrode unit 5 is an end portion of anode body 2 on the anode side. Resister 4 is formed on the upper surface and the lower surface of anode body 2 in the vicinity of anode electrode unit 5. Anode electrode unit 5, dielectric body 3, and cathode body 6 (described later) are electrically separated by resister 4.

As a method of forming resister 4, a known appropriate method may be adopted. For example, a method can be adopted in which a portion of dielectric body 3 is completely removed by laser or chemical etching, and then anode body 2 is coated with an insulating resin such as polyimide, polyamide, or epoxy. Alternatively, for example, a method of applying compressive stress to dielectric body 3 to form a dense layer to have insulating properties, a method of impregnating a portion of porous dielectric body 3 with an insulating resin, and the like may be adopted.

In addition, although FIG. 1 illustrates the case where resister 4 has a single structure, resister 4 may have a composite structure in which different materials are combined. For example, resister 4 may have a laminated structure of a dense Al oxide film and a polyimide resin.

Dielectric body 3 insulated from anode electrode unit 5 by resister 4 has a configuration in which a solid electrolyte layer is formed on a porous layer formed on both sides of the Al foil by a method such as chemical etching. The solid electrolyte layer is formed by a method such as chemical polymerization or electrolytic polymerization using a conductive polymer material such as polypyrrole or polythiophene.

Cathode body 6 is formed on dielectric body 3. Cathode body 6 is formed by sequentially laminating a carbon layer and a conductive silver (Ag) paste layer by, for example, a printing method or a transfer method.

Cathode body 6 is not limited to the laminated structure of the carbon layer and the conductive Ag paste layer. For example, cathode body 6 may contain a conductive paste using a filler other than Ag, a sintering material, or the like, instead of the conductive Ag paste. Examples of fillers other than Ag include copper (Cu) or nickel (Ni) core materials coated with Ag. The conductive paste may be a resin in which a metal filler is mixed.

Capacitor Element 1

As illustrated in FIG. 2, solid electrolytic capacitor 20 has a plurality of capacitor elements 1 laminated on each other. In the example illustrated in FIG. 2, three capacitor elements 1a, 1b, and 1c are laminated, and in the present disclosure, the number of capacitor elements 1 laminated on each other is not limited to three.

Capacitor element 1c disposed at the lowermost side is fixed on support member 7 via adhesive 8. Capacitor elements 1b and 1a are laminated on fixed capacitor element 1c via conductive adhesive 9. In the following description, any one of laminated capacitor elements 1a, 1b, and 1c may be referred, or a plurality of capacitor elements may be collectively referred to as capacitor element 1.

As support member 7, for example, a glass epoxy board, a board having excellent heat resistance such as a bismaleimide-triazine (BT) resin or a polyimide resin board, a lead frame made of Cu, or the like can be adopted. However, in a case where a conductive material such as a lead frame is used, it is necessary to insulate an anode side and a cathode side.

As conductive adhesive 9, for example, a conductive paste such as a conductive Ag paste is adopted. Conductive adhesive 9 is electrically connected to cathode body 6 of capacitor element 1.

As adhesive 8, a conductive paste similar to conductive adhesive 9 may be adopted, in addition to the insulating resin-based adhesive.

Adhesive 8 and conductive adhesive 9 may be an attachable sheet shape instead of the paste shape.

Figure 11:
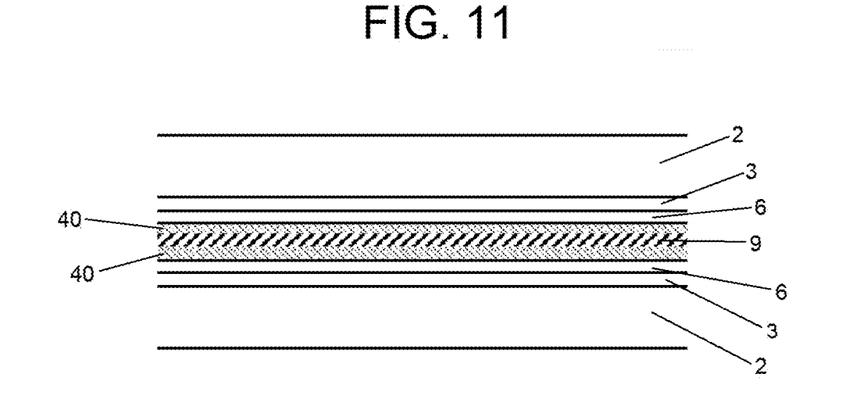
FIG. 11 is a cross-sectional view taken along line A-A' of FIG. 1B.

In addition, in the example illustrated in FIG. 2, only conductive adhesive 9 is provided between the capacitor elements adjacent to each other. For example, in addition to conductive adhesive 9, a metal foil 40 such as Al, Cu, indium (In) may be interposed as illustrated in FIG. 11.

The entire plurality of capacitor elements 1 are covered with exterior body 10 so that the end portions on the anode side and the end portions on the cathode side are exposed.

Base Electrode 11

Base electrode 11 is provided so as to cover the end portion of capacitor element 1 on the anode side, that is, anode electrode unit 5. Base electrode 11 is electrically connected to anode electrode unit 5. In addition, base electrode 11 is covered with conductive anode-side external electrode 15a.

Base electrode 11 is formed by, for example, the following method. That is, base electrode 11 is formed by subjecting the end face of anode electrode unit 5 to electroless Ni plating, forming Ag plating, and further coating with a conductive Ag paste. In addition, as another method, a method may be adopted in which metal particles are deposited on the end face of anode electrode unit 5 by a cold spray method and then coated with a conductive paste to form base electrode 11. Details of the cold spray method will be described later. As the metal particles used in a case where the cold spray method is adopted, for example, alloys such as bronze and brass are adopted, in addition to single element metals such as Cu, zinc (Zn), nickel (Ni), tin (Sn), and Ag. In addition, examples of the conductive paste include a conductive Ag paste, a conductive Cu paste, a resin containing a composite metal filler, a sintering material, and the like. In addition, base electrode 11 may be formed only by the cold spray method without coating with the conductive paste.

Contact Electrode 12

As described above, cathode body end portions 6a, 6b, and 6c, which are the end portions of capacitor element 1 on the cathode side, are exposed from exterior body 10. Cathode body end portions 6a, 6b, and 6c are the end portions of capacitor elements 1a, 1b, and 1c on the cathode side of cathode body 6, respectively. Contact electrode 12 is provided so as to cover the end portion of capacitor element 1 on the cathode side, that is, cathode body end portions 6a, 6b, and 6c.

Contact electrode 12 is formed on cathode body end portions 6a, 6b, and 6c made of a conductive paste containing a metal filler, and is not formed on exterior body 10 and support member 7, which are resin-based materials.

As the material of contact electrode 12, it is preferable to use a metal having low electrical resistance and low ionization tendency. Examples of such a metal include Cu, Zn, Ni, Sn, Ag, and the like. By using such a metal, the formation of an oxide film on the surface of contact electrode 12 is suppressed, so that the electrical connection between contact electrode 12 and conductive layer 13 can be ensured. Contact electrode 12 may be made of an alloy such as bronze or brass, or may be made by laminating different single metals such as Cu and Ag, in addition to being made of a single element metal.

Exterior Body 10

Exterior body 10 is formed of, for example, a resin mixed with an insulating filler, and covers capacitor elements 1 laminated as described above except for support member 7 and both end portions of capacitor element 1. As the insulating filler, for example, an inorganic filler such as silica ($SiO_2$) is adopted. In addition, as the resin, for example, an epoxy resin or the like is adopted.

It is desirable that the weight content of the insulating filler of exterior body 10 is smaller than the weight content of the metal filler of the conductive paste of cathode body 6. Furthermore, in a case where the material of contact electrode 12 is Cu or Zn, the resin of the exterior body is epoxy resin, the insulating filler of the exterior body is silica, and the metal filler of cathode body 6 is Ag, it is desirable that the weight content of the insulating filler of exterior body 10 is less than 85%, and the weight content of the metal filler of the conductive paste of cathode body 6 is 85% or more. Furthermore, it is more preferable that the weight content of the insulating filler of exterior body 10 is less than 75% and the weight content of the metal filler of the conductive paste of cathode body 6 is 86% or more in combination.

The reason is that, although the details will be described later, contact electrode 12 is suitably formed on cathode body end portions 6a, 6b, and 6c because exterior body 10 and cathode body 6 have such a relationship.

Anode-side External Electrode 15a and Cathode-side External Electrode 15b

Anode-side external electrode 15a and cathode-side external electrode 15b are formed so as to cover base electrode 11 and contact electrode 12, respectively. Anode-side external electrode 15a and cathode-side external electrode 15b include conductive layer 13 and surface treatment layer 14, respectively.

As the material of conductive layer 13, for example, a conductive paste material in which a metal filler such as Ag or Cu is mixed in a resin material serving as a binder is adopted.

Surface treatment layer 14 is a coating layer formed on the surface of conductive layer 13. Surface treatment layer 14 has, for example, a laminated structure of a Ni layer and a Sn layer. The material of surface treatment layer 14 may be any metal whose outer surface is excellent in wettability with solder. Examples of such a metal include Sn, gold (Au), Ag, palladium (Pd), and the like.

Second Exemplary Embodiment

Figure 3A:
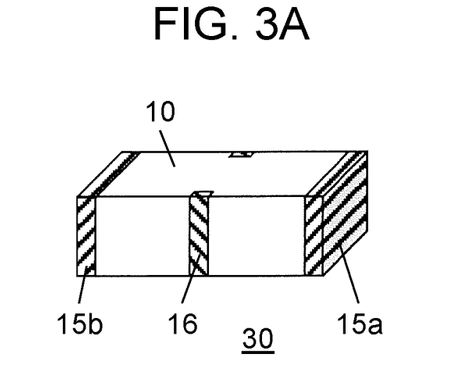
FIG. 3A is a perspective view illustrating a configuration of a solid electrolytic capacitor according to a second exemplary embodiment of the present disclosure.
Figure 3B:
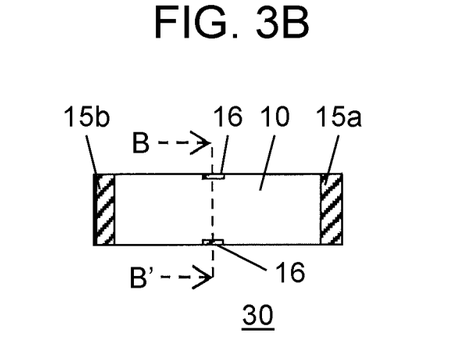
FIG. 3B is a top view illustrating the configuration of the solid electrolytic capacitor according to the second exemplary embodiment of the present disclosure.
Figure 4:
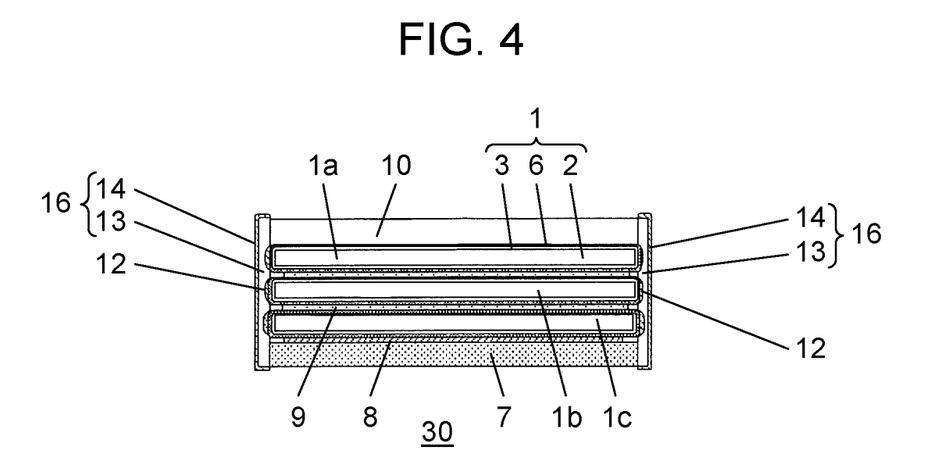
FIG. 4 is a cross-sectional view taken along line B-B' of FIG. 3B.

Next, a configuration of solid electrolytic capacitor 30 according to a second exemplary embodiment of the present disclosure will be described with reference to FIGS. 3A, 3B, and 4. FIG. 3A is a perspective view illustrating the solid electrolytic capacitor according to the second exemplary embodiment of the present disclosure, and FIG. 3B is a top view of the solid electrolytic capacitor. FIG. 4 is a cross-sectional view taken along line B-B' of FIG. 3.

In a second exemplary embodiment of the present disclosure, as illustrated in FIGS. 3A and 3B, cathode-side side electrode 16 is formed on a plane orthogonal to the plane on which anode-side external electrode 15a is disposed. With such a structure, the cathode-side electrode can be disposed near the anode as compared with the case where cathode-side side electrode 16 is not formed, so that the frequency characteristic of solid electrolytic capacitor 30 can be improved.

In FIGS. 3A and 3B, both cathode-side external electrode 15b and cathode-side side electrode 16 are formed. For example, only cathode-side side electrode 16 may be formed without forming cathode-side external electrode 15b.

As illustrated in FIG. 4, cathode-side side electrode 16 includes conductive layer 13 and surface treatment layer 14, similarly to cathode-side external electrode 15b. Cathode-side side electrode 16 is disposed so as to cover contact electrode 12 provided on the portion exposed from exterior body 10 of cathode body 6, and is electrically connected to cathode body 6. Other configurations are the same as those of solid electrolytic capacitor 20 according to the first exemplary embodiment.

Manufacturing Method

Next, a method of manufacturing the solid electrolytic capacitor according to the present disclosure will be described. Hereinafter, the method of manufacturing solid electrolytic capacitor 20 according to the first exemplary embodiment illustrated in FIGS. 1 and 2 will be described with reference to FIGS. 5A to 5C and FIGS. 6A to 6C. FIGS. 5A to 5C and FIGS. 6A to 6C are cross-sectional views of the solid electrolytic capacitor in each step of the method of manufacturing the solid electrolytic capacitor, respectively.

Laminating Step

Figure 5A:
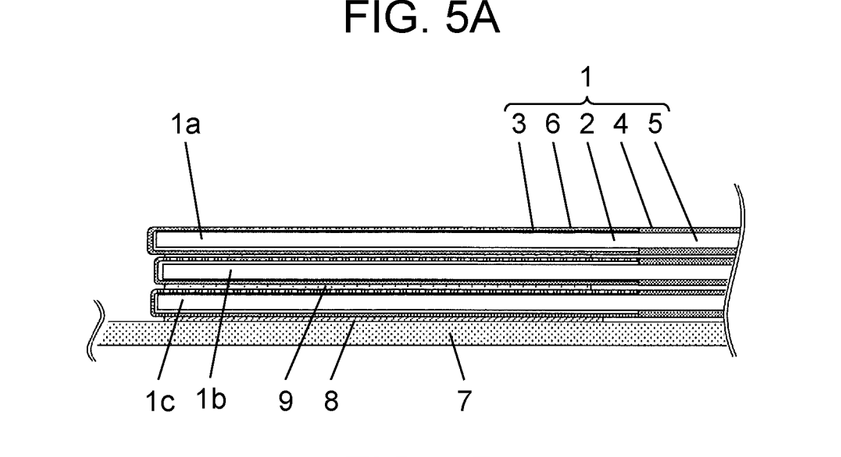
FIG. 5A is a cross-sectional view of the solid electrolytic capacitor in a laminating step of a method of manufacturing the solid electrolytic capacitor.

First, a laminating step illustrated in FIG. 5A is performed. In the laminating step, an appropriate amount of adhesive 8 is applied onto support member 7, and one of a plurality of capacitor elements 1 prepared in advance (capacitor element 1c) is placed on support member 7 with high accuracy.

Next, an appropriate amount of conductive adhesive 9 is applied on capacitor element 1c, and capacitor element 1b is placed on conductive adhesive 9. Furthermore, an appropriate amount of conductive adhesive 9 is applied on capacitor element 1b, and capacitor element 1a is placed on conductive adhesive 9.

As a method of applying adhesive 8 and conductive adhesive 9, for example, a known method such as a dispensing method, printing, an ink jet method, a clip method, or a transfer method can be appropriately adopted.

Adhesive 8 and conductive adhesive 9 are thermoset using a high-temperature furnace or the like to conduct cathode bodies 6 of each of capacitor elements 1 to each other. Means for thermosetting are not limited to a high-temperature furnace, and for example, a hot plate or a reflow furnace may be used.

In the above description, the case where capacitor elements 1 are sequentially laminated at a portion on support member 7 is described, and a plurality of capacitor elements may be simultaneously laminated at a plurality of portions on support member 7 (for example, in a matrix of a plurality of columns and a plurality of rows).

Sealing Step

Figure 5B:
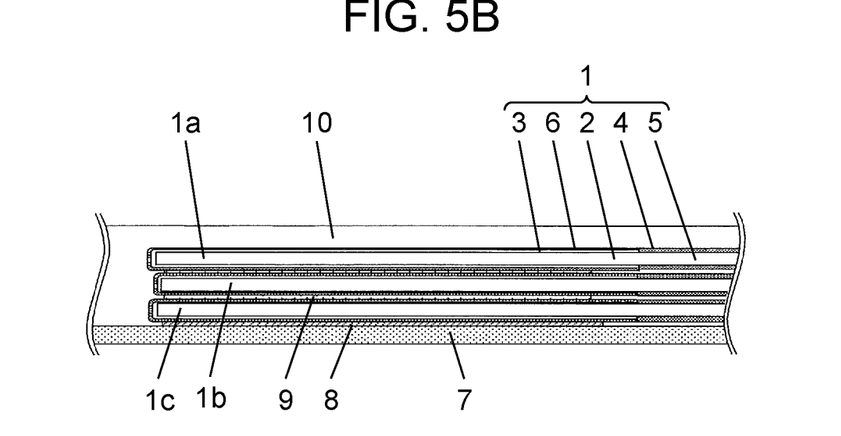
FIG. 5B is a cross-sectional view of the solid electrolytic capacitor in a sealing step of a method of manufacturing the solid electrolytic capacitor.

Next, a sealing step illustrated in FIG. 5B is performed. In the sealing step, as illustrated in FIG. 5B, capacitor element 1 is sealed with exterior body 10 so as to cover entire laminated capacitor element 1. At this time, it is preferable that exterior body 10 is also filled in a gap between laminated capacitor elements 1 and a gap between support member 7 and capacitor element 1. The gap between laminated capacitor elements 1 and the gap between support member 7 and capacitor element 1 may be previously filled with a resin material different from that of exterior body 10.

As a method of sealing capacitor element 1 using exterior body 10, for example, a known method such as a transfer method, a compression method, or a method in which a liquid resin is poured into a mold and then heat-cured may be appropriately adopted.

Picking-up End Face Step

Figure 5C:
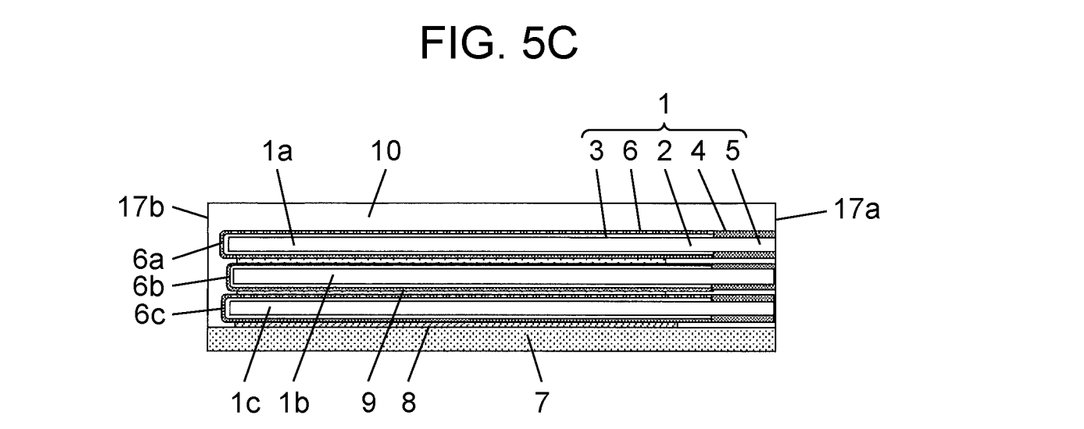
FIG. 5C is a cross-sectional view of the solid electrolytic capacitor in a picking-up end face step in a method of manufacturing the solid electrolytic capacitor.

Next, a picking-up end face step illustrated in FIG. 5C is performed. In the picking-up end face step, on the anode side of capacitor element 1 sealed with exterior body 10, the end face is picked up so that anode electrode unit 5 is exposed from exterior body 10. As a result, anode-side end face 17a is formed. In addition, on the cathode side, the end face is picked up to the extent that cathode body end portions 6a, 6b, and 6c are not exposed. As a result, cathode-side end face 17b is formed with exterior body 10 left so that cathode body end portions 6a, 6b, and 6c are not exposed.

As a method of picking-up the end face, for example, a method of cutting capacitor element 1 sealed with exterior body 10 by rotating a dicing blade in which diamond particles are fixed with a bond material at a high speed may be adopted.

Cathode-side end face 17b may be previously formed in the sealing step described above. In addition, in the above description, in the picking-up end face step, the end face is picked up to the extent that cathode body end portions 6a, 6b, and 6c are not exposed from exterior body 10, and a portion of cathode body end portions 6a, 6b, and 6c may be exposed from exterior body 10.

Contact Electrode Forming Step

Figure 6A:
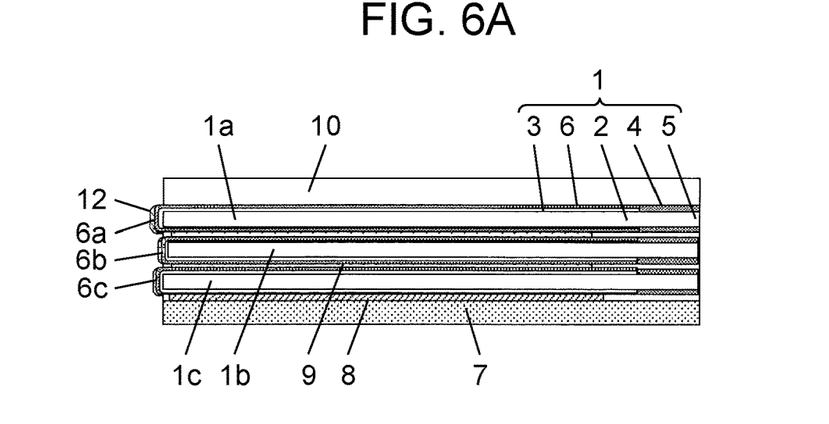
FIG. 6A is a cross-sectional view of the solid electrolytic capacitor in a contact electrode forming step of a method of manufacturing the solid electrolytic capacitor.

Next, a contact electrode forming step illustrated in FIG. 6A is performed. In the contact electrode forming step, a cold spray method is used.

The cold spray method is a technique of accelerating metal particles on the order of several μm to several tens of μm at subsonic, sonic or supersonic speeds by a compressed gas such as air, nitrogen, helium, causing the metal particles to collide with a base material in a solid phase to bond the metal particles to the base material, and forming a metal film.

In the cold spray method, in a case where the base material is a metal, it is considered that the metal particles or the metal base material are plastically deformed by the collision energy of the metal particles with the base material, and the metal surface is activated by exposing a new surface, and the metal particles and the base material are bonded to each other.

On the other hand, in a case where the base material is a resin, when the hardness of the resin is high to some extent, it is considered that the plastically deformed metal particles bite into the irregularities on the surface of the resin base material caused by the collision of the metal particles, so that the metal particles and the base material are mechanically bonded to each other. In a case where the hardness of the resin is low to some extent, the resin base material is destroyed by the collision of the metal particles, so that the metal particles are not bonded to the surface of the resin base material.

In the method of manufacturing the solid electrolytic capacitor according to the present disclosure, the metal particles are sprayed onto cathode-side end face 17b in which cathode body end portions 6a, 6b, and 6c are not exposed from exterior body 10 by using the cold spray method. As a result, it is possible to destroy exterior body 10, which is a resin material, and to bond the metal particles to cathode body end portions 6a, 6b, and 6c, which are metal materials, at the same time.

In order to suitably destroy exterior body 10 by the cold spray method and form a metal film on the surfaces of cathode body end portions 6a, 6b, and 6c, it is necessary to adjust the hardness of exterior body 10 to a preferable hardness range. The preferable hardness range is a hardness range in which the metal particles are efficiently plastically deformed and the base material is efficiently destroyed by the energy of the metal particles colliding with exterior body 10.

In a case where the metal particles are Cu or Zn and exterior body 10 is a mixed material of an epoxy resin and a filler (silica), as described above, it is experimentally found that exterior body 10 has a preferable hardness range by setting the weight content of the filler of exterior body 10 to less than 85%.

In addition, in a case where cathode body 6 is a mixed material of an epoxy resin and a filler (Ag), by setting the weight content of the metal filler of cathode body 6 to 85% or more, the metal particles are suitably bonded to the surfaces of cathode body end portions 6a, 6b, and 6c, and a metal film is formed.

Furthermore, when the weight content of the insulating filler of exterior body 10 is less than 75% and the weight content of the metal filler of cathode body 6 is 86% or more, it is more preferable because the metal particles preferably grind exterior body 10 and the metal film is selectively formed on the surfaces of cathode body end portions 6a, 6b, and 6c.

In a case where a material such as Sn, which has a lower Young's modulus and hardness than those of Cu or Zn, is used for the metal particles, the weight content of the insulating filler in exterior body 10 and the weight content of the metal filler in cathode body 6 may be set to lower values.

FIGS. 7A to 7D are diagrams for describing aspects in which contact electrode 12 is formed in the contact electrode forming step. In FIGS. 7A to 7D, 23 is a cold spray device, 24 are metal particles ejected from cold spray device 23 at high speed, and 25 is a metal film formed on cathode body end portions 6a, 6b, and 6c.

Figure 7A:
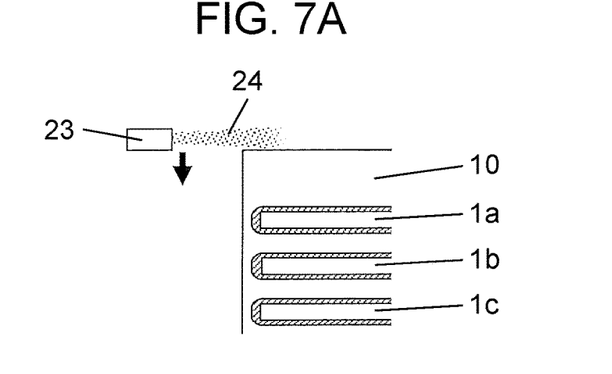
FIG. 7A is a diagram for describing an aspect in which a contact electrode is formed in the contact electrode forming step.
Figure 7B:
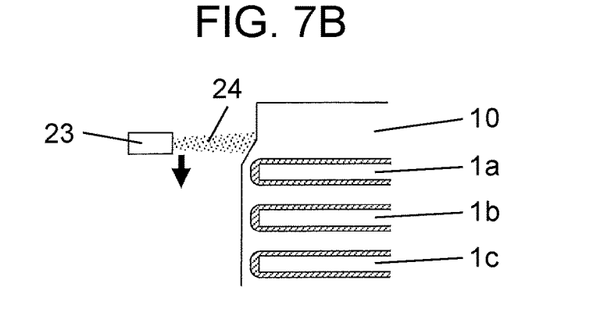
FIG. 7B is a diagram for describing an aspect in which the contact electrode is formed in the contact electrode forming step.

First, as illustrated in FIG. 7A, capacitor elements 1a, 1b, and 1c covered with exterior body 10 are prepared. Next, as illustrated in FIG. 7B, accelerated metal particles 24 are ejected from cold spray device 23, and cold spray device 23 is gradually moved to grind exterior body 10.

Figure 7C:
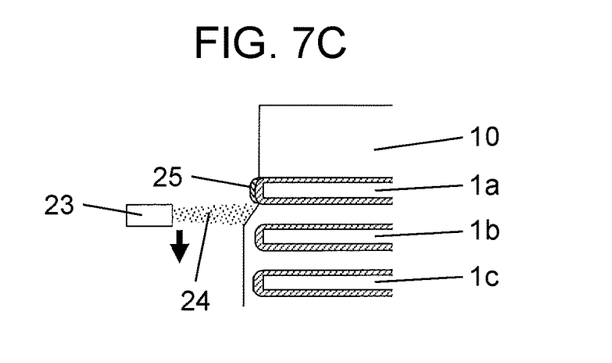
FIG. 7C is a diagram for describing an aspect in which the contact electrode is formed in the contact electrode forming step.

As illustrated in FIG. 7C, by continuously moving cold spray device 23, exterior body 10 covering capacitor elements 1a, 1b, and 1c is ground, and cathode body end portions 6a, 6b, and 6c are sequentially exposed. At this time, metal particles 24 are bonded to the exposed portions of cathode body end portions 6a, 6b, and 6c to form metal film 25. Therefore, the exposed portions of cathode body end portions 6a, 6b, and 6c are covered with metal film 25 with substantially no grinding.

Figure 7D:
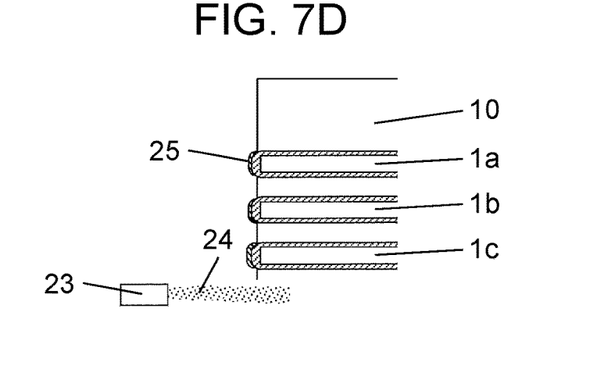
FIG. 7D is a diagram for describing an aspect in which the contact electrode is formed in the contact electrode forming step.

FIG. 7D illustrates an aspect in which cathode body end portions 6a, 6b, and 6c are exposed from exterior body 10 and metal film 25 is formed on each of the cathode body ends.

As a method of grinding exterior body 10 that covers cathode body 6, in addition to the method described above, for example, a sandblasting method in which grinding abrasive grains such as alumina are sprayed at high speed to perform grinding can be considered. However, in the case of the sandblasting method, exposed cathode body 6 and dielectric body 3 are simultaneously also ground as exterior body 10 is ground, and there is a risk that anode body 2 and cathode body 6, which are originally insulated by dielectric body 3, may leak electrically (refer to FIG. 1). In order to prevent this leak, for example, it is necessary to increase the thickness of cathode body 6.

In the cold spray method described above, the steps of grinding exterior body 10 covering capacitor element 1 to expose cathode body end portions 6a, 6b, and 6c and the step of forming a metal film on the exposed portion can be performed at the same time. Therefore, even when the thickness of cathode body 6 is reduced as compared with the case where the sandblasting method is adopted, it is possible to prevent the situation where cathode body 6 is ground together with exterior body 10, and it is possible to reliably form metal film 25 on the surfaces of cathode body end portions 6a, 6b, and 6c exposed from exterior body 10. In the solid electrolytic capacitor according to the present disclosure, the thickness of cathode body 6 (cathode body end portions 6a, 6b, and 6c) can be set to, for example, 200 µm or less.

Returning to the description of FIG. 6A. Metal film 25 illustrated in FIGS. 7C and 7D is contact electrode 12 illustrated in FIG. 6A. That is, using the cold spray method, exterior body 10 can be ground to expose cathode body end portions 6a, 6b, and 6c, and contact electrodes 12 can be formed on cathode body end portions 6a, 6b, and 6c.

As illustrated in FIGS. 5A to 5C and 6A to 6C, in the plurality of laminated capacitor elements 1, the horizontal positions of cathode body end portions 6a, 6b, and 6c may be different from each other. For example, this may occur due to a placing error when laminating the plurality of capacitor elements 1, a variation in the size of the capacitor elements themselves, or expansion or contraction when curing adhesive 8 or conductive adhesive 9.

In the contact electrode forming step, it is necessary to expose all cathode body end portions 6a, 6b, and 6c.

Therefore, in the step of grinding exterior body 10 by using the cold spray method illustrated in FIG. 7C or the like, the speed at which the metal particles are accelerated or the ejection amount of the metal particles is set to a value that can reliably expose the cathode body end portion (6b in the example of FIG. 5C) at the deepest position from the surface of exterior body 10 on which the cold spray is performed. The relationship between the speed at which the metal particles are accelerated or the ejection amount of the metal particles and the distance from the surface of exterior body 10 to the cathode body end portion at the deepest position may be determined in advance by, for example, an experiment.

Once the formation of contact electrode 12 by the cold spray method is started, the speed at which the metal particles are accelerated or the ejection amount of the metal particles are constant until the formation of contact electrode 12 is completed. Therefore, the thickness of the metal films (contact electrodes 12) formed on cathode body end portions 6a, 6b, and 6c are different from each other according to the distance from the surface of exterior body 10 on which the cold spray is performed to the surface of cathode body end portions 6a, 6b, and 6c.

A specific example will be described. The amount of exterior body 10 to be ground before the cathode body end portion is exposed can be reduced in the cathode body end portion at a relatively shallow position (6a in the example of FIG. 5C) than in the cathode body end portion at a relatively deep position (6b in the example of FIG. 5C). Therefore, the time for exposing the cathode body end portion at a relatively shallow position is shorter than the time for exposing the cathode body end portion at a relatively deep position. Since the amount of metal particles ejected per unit area per hour is constant, the thickness of the metal film formed on the surface of the cathode body end portion at a relatively shallow position is thicker than the thickness of the metal film formed on the surface of the cathode body end portion at a relatively deep position. In other words, the longer a protrusion length of cathode body 6 from exterior body 10, the thicker a thickness of the metal film.

Base Electrode Forming Step

Figure 6B:
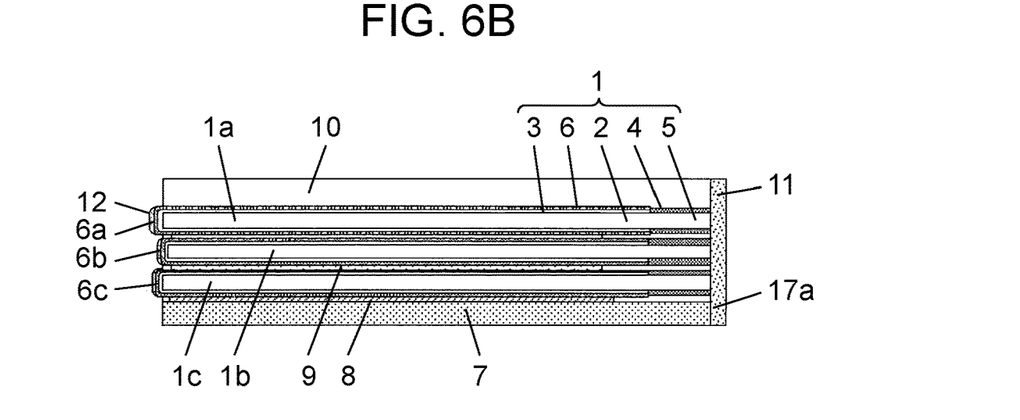
FIG. 6B is a cross-sectional view of the solid electrolytic capacitor in a base electrode forming step of a method of manufacturing the solid electrolytic capacitor.

Next, as illustrated in FIG. 6B, a base electrode forming step is performed. In the present exemplary embodiment, the base electrode forming step is performed after the contact electrode forming step, and the base electrode forming step may be performed before the contact electrode forming step.

As illustrated in FIG. 6B, base electrode 11 is formed so as to cover anode-side end face 17a. As a method of forming base electrode 11, for example, there is a method of coating the entire surface of anode-side end face 17a with a conductive Ag paste by a clip method or the like, after forming a metal film by colliding the metal particles such as Cu with the end face of anode electrode unit 5 using the cold spray method.

In addition, similarly to the contact electrode forming step, from the state where a portion of anode electrode unit 5 is covered with exterior body 10, exterior body 10 may be ground by a cold spray method to expose the end face of anode electrode unit 5, and at the same time, a metal film may be formed to form base electrode 11.

Furthermore, as another method, a method of forming a metal film by plating on the end face of anode electrode unit 5 by a plating method and then coating the conductive Ag paste may be adopted.

Forming Step

Figure 6C:
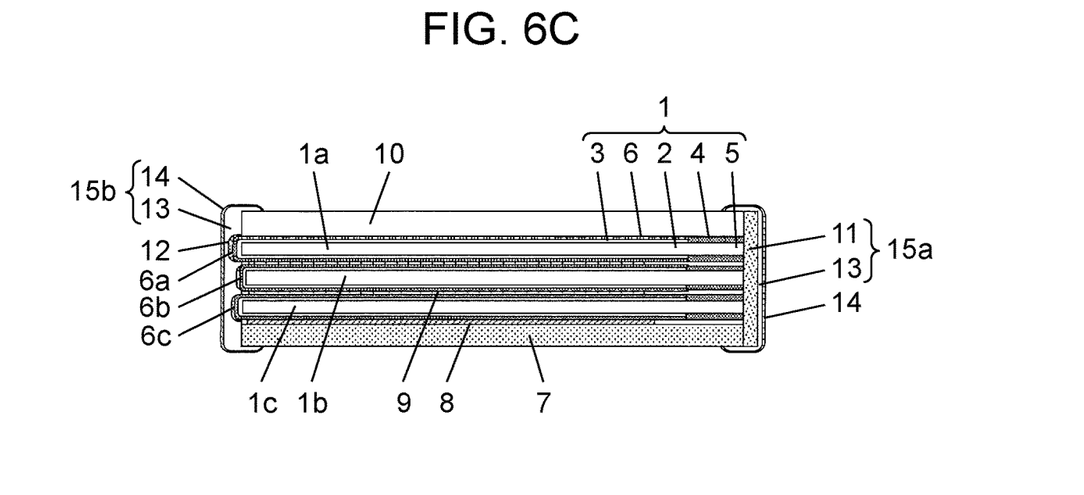
FIG. 6C is a cross-sectional view of the solid electrolytic capacitor in a step of forming an anode-side external electrode and a cathode-side external electrode in a method of manufacturing the solid electrolytic capacitor.

Finally, as illustrated in FIG. 6C, a step of forming anode-side external electrode 15a and cathode-side external electrode 15b is performed. In the step of forming anode-side external electrode 15a and cathode-side external electrode 15b, first, conductive layer 13 is formed so as to cover the surfaces of base electrode 11 and contact electrode 12, and then surface treatment layer 14 is formed so as to cover the surface of conductive layer 13.

Conductive layer 13 is formed by applying, for example, a conductive Ag paste to each end face by a clip method, a transfer method, a printing method, a dispensing method, or the like, and then curing at a high temperature.

Surface treatment layer 14 may be formed by, for example, a barrel plating method, which is one of the electrolytic plating methods. Surface treatment layer 14 has, for example, a laminated structure of Ni and Sn.

In a case where the positions of cathode body end portions 6a, 6b, and 6c in the horizontal direction are different as illustrated in FIG. 5C and the like, when viewed from the outer surface of cathode-side external electrode 15b, cathode body end portions 6a, 6b, and 6c form irregularities. In such a case, the bonding strength between cathode body end portions 6a, 6b, and 6c and conductive layer 13 covering these cathode body end portions is likely to be stronger than in the case where the cathode body end portions do not form the irregularities. Therefore, even when an external force is applied to cathode-side external electrode 15b, it is possible to reduce the situation where cathode-side external electrode 15b is detached from cathode body end portions 6a, 6b, and 6c.

Action and Effect

The method of manufacturing the solid electrolytic capacitor according to the exemplary embodiment of the present disclosure includes a step of exposing cathode body end portions 6a, 6b, and 6c, which are a portion of cathode body 6, from the exterior body covering cathode body 6, which is a conductor, and forming contact electrode 12, which is a metal film, on exposed cathode body end portions 6a, 6b, and 6c.

As described above, according to the method of manufacturing the solid electrolytic capacitor according to the exemplary embodiment of the present disclosure, the exposure of cathode body end portions 6a, 6b, and 6c from exterior body 10 and the formation of contact electrode 12 at exposed cathode body end portions 6a, 6b, and 6c can be performed at the same time. Therefore, since the man-hours required for manufacturing the solid electrolytic capacitor can be reduced, the solid electrolytic capacitor can be manufactured at low cost, as compared with the case where the exposure of cathode body end portions 6a, 6b, and 6c from exterior body 10 and the formation of contact electrodes 12 at exposed cathode body end portions 6a, 6b, and 6c are performed separately.

According to the present disclosure, a compact solid electrolytic capacitor can be manufactured at low cost.

In addition, according to the method of manufacturing the solid electrolytic capacitor according to the exemplary embodiment of the present disclosure, as illustrated in FIG. 5C and the like, even in a case where the positions of cathode body end portions 6a, 6b, and 6c of capacitor element 1 in the horizontal direction are different from each other, contact electrodes 12 can be suitably formed on each of the surfaces. The compact solid electrolytic capacitor can be manufactured by covering contact electrode 12 with conductive layer 13 and forming surface treatment layer 14 so as to cover the surface of conductive layer 13.

Hereinafter, the reason why the solid electrolytic capacitor manufactured by the method of manufacturing the solid electrolytic capacitor according to the exemplary embodiment of the present disclosure is relatively compact will be described in comparison with a comparative example.

Figure 8:
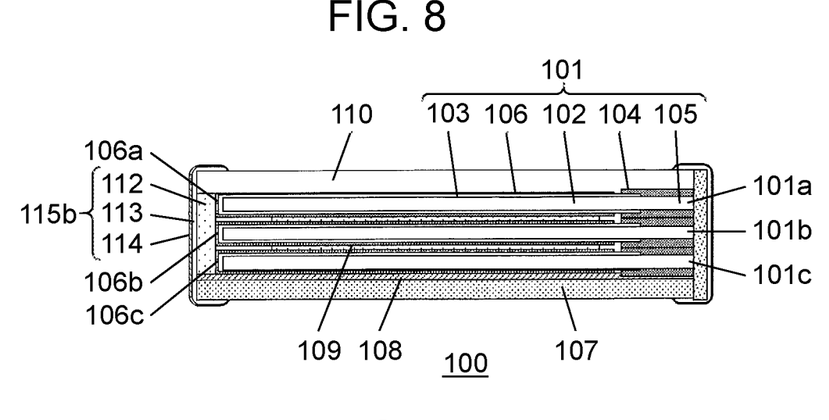
FIG. 8 is a cross-sectional view illustrating a configuration of a solid electrolytic capacitor of a comparative example.

FIG. 8 is a cross-sectional view illustrating a solid electrolytic capacitor manufactured by a manufacturing method in the related art, which is a comparative example of the solid electrolytic capacitor according to the exemplary embodiment of the present disclosure. In the example illustrated in FIG. 8, solid electrolytic capacitor 100 includes capacitor element 101 (101a, 101b, and 101c) including anode body 102, dielectric body 103, resister 104, anode electrode unit 105, and cathode body 106, and is configured by laminating three capacitor elements 101a, 101b, and 101c, similarly to solid electrolytic capacitors 20 and 30 of the above-described exemplary embodiment.

Cathode bodies 106 of each element are bonded to each other by conductive adhesive 109 and are electrically connected to each other. Capacitor element 101c disposed at the lowermost side is fixed on board 107 via adhesive 108. The plurality of elements are covered with exterior body 110 such as an insulating resin except for the electrodes on the cathode side and the anode side and board 107. In the example illustrated in FIG. 8, the left side of the figure is the cathode side and the right side is the anode side.

Figure 9:
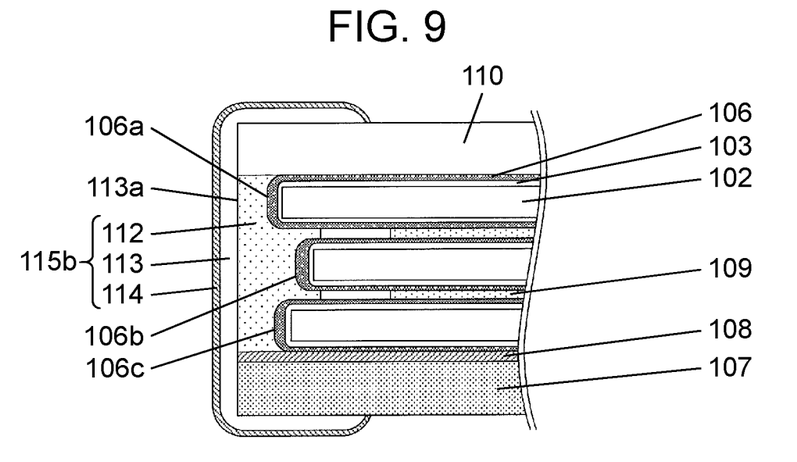
FIG. 9 is an enlarged view of a periphery of a cathode-side external electrode of FIG. 8.

FIG. 9 is an enlarged view of a periphery of cathode-side external electrode 115b in FIG. 8. Cathode body end portions 106a, 106b, and 106c, which are the end portions of cathode body 106, are exposed from exterior body 110 and are connected to external electrode 114 via conductive paste 112 and intermediate electrode 113.

Conductive paste 112 serves to electrically connect intermediate electrode 113 and external electrode 114. As illustrated in FIG. 9, conductive paste 112 is provided to reliably connect cathode body end portions 106a, 106b, and 106c whose horizontal positions are different from each other to intermediate electrode 113.

Figure 10:
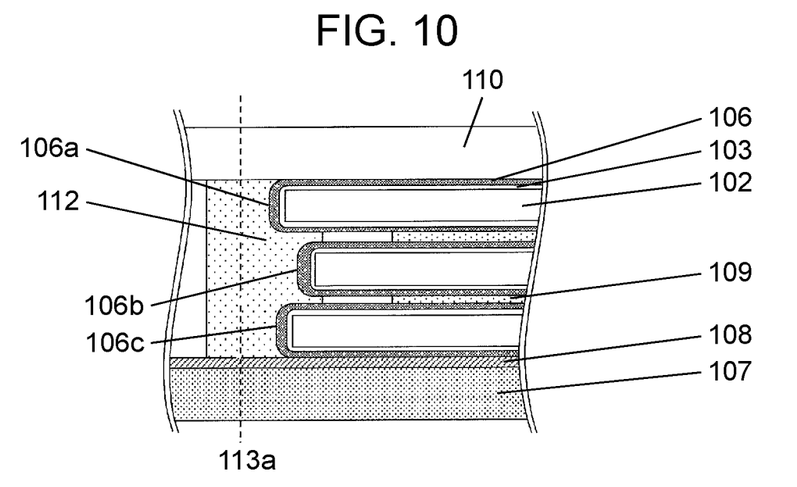
FIG. 10 is a diagram for describing a portion of a method of manufacturing the solid electrolytic capacitor illustrated in FIGS. 8 and 9.

FIG. 10 is a diagram for describing a portion of a method of manufacturing solid electrolytic capacitor 100 illustrated in FIGS. 8 and 9. As illustrated in FIG. 10, cathode body end portions 106a, 106b, and 106c of the plurality of capacitor elements 101a, 101b, and 101c laminated on each other are covered with conductive paste 112, and conductive paste 112 is cut at appropriate cutting position 113a by dicing or the like. Thereafter, cathode-side external electrode 115b is formed by forming intermediate electrode 113 and external electrode 114 on the cut surface.

Comparing the structure of solid electrolytic capacitor 100 in the related art illustrated in FIG. 9 and the like with solid electrolytic capacitor 20 manufactured by the manufacturing method according to the exemplary embodiment of the present disclosure illustrated in FIG. 1 and the like, the following can be said. That is, in solid electrolytic capacitor 20 manufactured by the manufacturing method according to the exemplary embodiment of the present disclosure, since cathode body end portions 6a, 6b, and 6c and conductive layer 13 are directly bonded to each other, as compared with solid electrolytic capacitor 100 manufactured by the manufacturing method in the related art in which cathode body end portions 106a, 106b, and 106c and intermediate electrode 113 are connected to each other via conductive paste 112, the amount of conductive paste used can be reduced.

Since a paste mainly containing silver (Ag) as a main component is often used as the conductive paste, and the conductive Ag paste is expensive, the cost for manufacturing the solid electrolytic capacitor can be reduced by reducing the amount of the conductive paste used. That is, solid electrolytic capacitor 20 manufactured by the manufacturing method according to the exemplary embodiment of the present disclosure can be manufactured at a lower cost than solid electrolytic capacitor 100 manufactured by the manufacturing method in the related art illustrated in FIGS. 8 and 9 and the like.

In addition, in solid electrolytic capacitor 20 manufactured by the manufacturing method according to the exemplary embodiment of the present disclosure, since conductive paste 112 layer in solid electrolytic capacitor 100 in the related art is not required, the size can be reduced in the horizontal direction by the thickness of conductive paste 112 in the horizontal direction.

The present disclosure is not limited to the description of the above exemplary embodiment, and various modifications can be made without departing from the spirit of the present disclosure.

Since the solid electrolytic capacitor of the present disclosure has high reliability and productivity while maintaining good electrical characteristics, the solid electrolytic capacitor is useful as a capacitor in all fields such as an electronic device (for example, personal computer and mobile terminal), an industrial device, and an in-vehicle device.

What is claimed is:

1. A solid electrolytic capacitor comprising:
   a plurality of capacitor elements, each of the plurality of capacitor elements having an anode body, a dielectric film covering the anode body, and a cathode body formed on the dielectric film; and
   an exterior body formed so that the cathode body of each of the plurality of capacitor elements is exposed, wherein
   a plurality of metal films are respectively formed on a portion of the cathode body of a corresponding one of the plurality of capacitor elements exposed from the exterior body and not formed on the exterior body,
   a protrusion length of the cathode body from the exterior body is different for each of the capacitor elements,
   the plurality of capacitor elements are laminated, and
   the longer the protrusion length of the cathode body from the exterior body, the thicker a thickness of the metal film formed on the cathode body.

2. The solid electrolytic capacitor of claim 1, wherein the cathode body of each of the plurality of capacitor elements is formed of a conductive paste in which a metal filler is mixed in a resin.

3. The solid electrolytic capacitor of claim 2, wherein the exterior body is made of a resin material in which an insulating filler is mixed, and
   a weight content of the insulating filler of the exterior body is smaller than a weight content of the metal filler of the cathode body of each of the plurality of capacitor elements.

4. The solid electrolytic capacitor of claim 1, wherein the cathode body of each of the plurality of capacitor elements has a thickness of 200 µm or less.

5. The solid electrolytic capacitor of claim 1, wherein a plane on which an anode-side external electrode electrically connected to the dielectric film is disposed and a plane on which a cathode-side external electrode electrically connected to the metal film is disposed are parallel to each other.

6. The solid electrolytic capacitor of claim 1, wherein a plane on which an anode-side external electrode electrically connected to the dielectric film is disposed and a plane on which a cathode-side external electrode electrically connected to the metal film is disposed are orthogonal to each other.

7. The solid electrolytic capacitor of claim 1, wherein a metal foil is disposed between capacitor elements adjacent to each other among the plurality of capacitor elements.

* * * * *